United States Patent [19]

Snell

[11] 4,038,818
[45] Aug. 2, 1977

[54] GAS TURBINE POWER PLANT HAVING SERIES-PARALLEL VALVE ARRANGEMENT

[75] Inventor: Leonard Stanley Snell, Bristol, England

[73] Assignee: Rolls-Royce (1971) Limited, London, England

[21] Appl. No.: 362,682

[22] Filed: May 22, 1973

[30] Foreign Application Priority Data

May 25, 1972  United Kingdom ............... 24662/72

[51] Int. Cl.² ............................................. F02K 3/06
[52] U.S. Cl. .................... 60/226 R; 415/145
[58] Field of Search ............... 60/225, 226 R, 226 A, 60/229, 244, 39.33, 262, 39.29; 244/23 A, 23 B, 23 C, 23 D, 23 R; 415/66–69, 144, 145, 153 A, 153 R, 79

[56] References Cited

U.S. PATENT DOCUMENTS

| 2,831,627 | 4/1958 | Brunner | 60/39.29 |
| 3,296,800 | 1/1967 | Keenan et al. | 60/244 |
| 3,514,952 | 6/1970 | Schumacher et al. | 60/226 X |
| 3,792,584 | 2/1974 | Klees | 60/226 R |

FOREIGN PATENT DOCUMENTS 713,783  8/1954  United Kingdom ............ 60/226 R

*Primary Examiner*—Carlton R. Croyle
*Assistant Examiner*—Robert E. Garrett
*Attorney, Agent, or Firm*—Stevens, Davis, Miller & Mosher

[57] ABSTRACT

A gas turbine powerplant which has two compressor parts alternatively connectable:

1. in series for supersonic flight, or, 2. in parallel for subsonic flight and particularly useful at take-off. The compressor parts are co-axial and a valve extends obliquely between them having two positions corresponding to the two alternatives above. In the first position the valve allows series flow and in the second position its obliquity deflects the delivery of the first compressor part out into a bypass duct and allows ambient air into the second compressor part.

2 Claims, 15 Drawing Figures

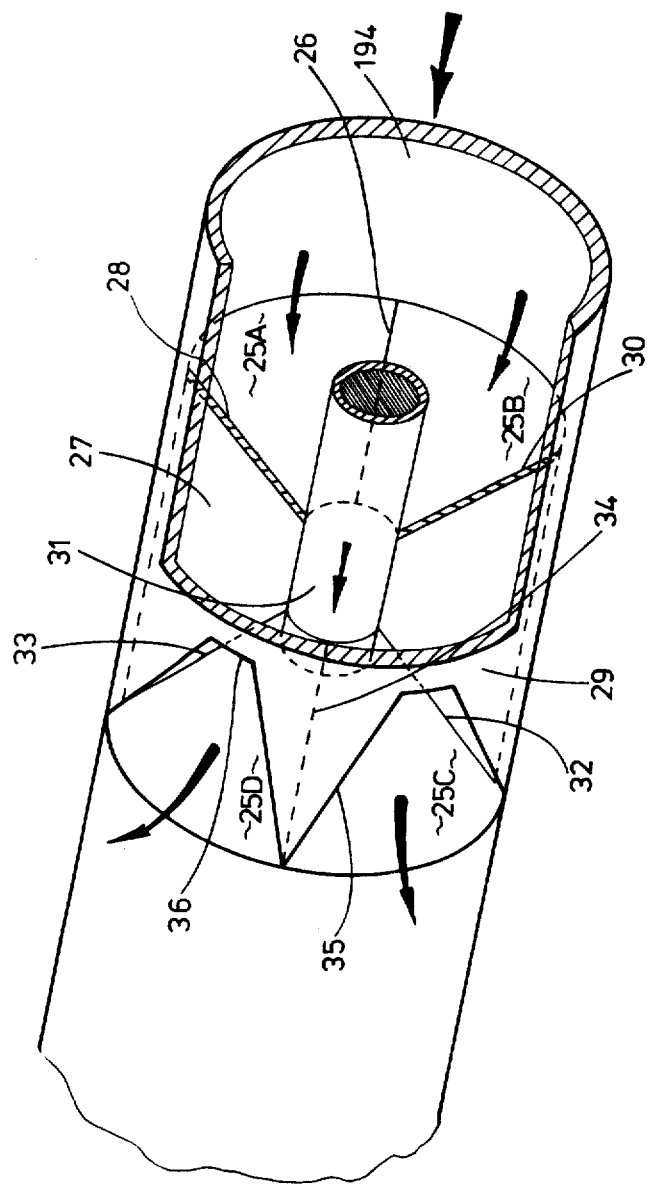

GAS TURBINE POWER PLANT HAVING SERIES-PARALLEL VALVE ARRANGEMENT

This invention relates to gas turbine powerplant for aircraft propulsion.

According to this invention there is provided a gas turbine powerplant comprising a gas turbine engine having a compressor having an upstream part and a co-axial downstream part, a combustor arranged downstream of and in flow series with the downstream part of the compressor and valve means having two alternative positions, characterized in that in the first position the valve means is disposed for directing the delivery of the upstream part into the downstream part and in the second position the valve means is disposed for directing the delivery of the upstream part to be exhausted to atmosphere and for directing ambient air into the downstream part.

The invention makes it possible to combine in the same powerplant the properties of a straight turbojet (desirable for supersonic flight) and a bypass engine of relatively high bypass ratio (desirable for relatively quiet take-off) while preserving a relatively small powerplant frontal area.

In the second position of the valve means the nozzles and intakes are situated on the plant in positions sufficiently spaced apart to avoid ingestion of the exhaust from the upstream compressor part into the second downstream compressor part. For example the second nozzle and intake may be situated at diametrically opposite sides of the plant.

The plant may comprise a housing having access to the compressor parts and to the second nozzle and intake.

The housing may have access to the second nozzle and intake at opposite sides of the engine, and the valve means may be adapted to establish, when in the second position, a partition extending obliquely across the erstwhile first flow path and establishing said second flow paths.

Examples of powerplants according to this invention will now be described with reference to the accompanying drawings wherein:

FIGS. 1, 2 and 3 show a first embodiment,

FIGS. 1 and 2 are sectional plan views of a powerplant in different operational conditions, each taken horizontally through the central axis of rotation of the powerplant, FIG. 3 is a section on the line III—III in FIG. 2, FIGS. 4, 5 and 6 show a variation to the first embodiment, FIG. 4 is a broken-away perspective view of a valve arrangement, FIG. 5 is a sectional plan of the arrangement of FIG. 4;

Figure 7:
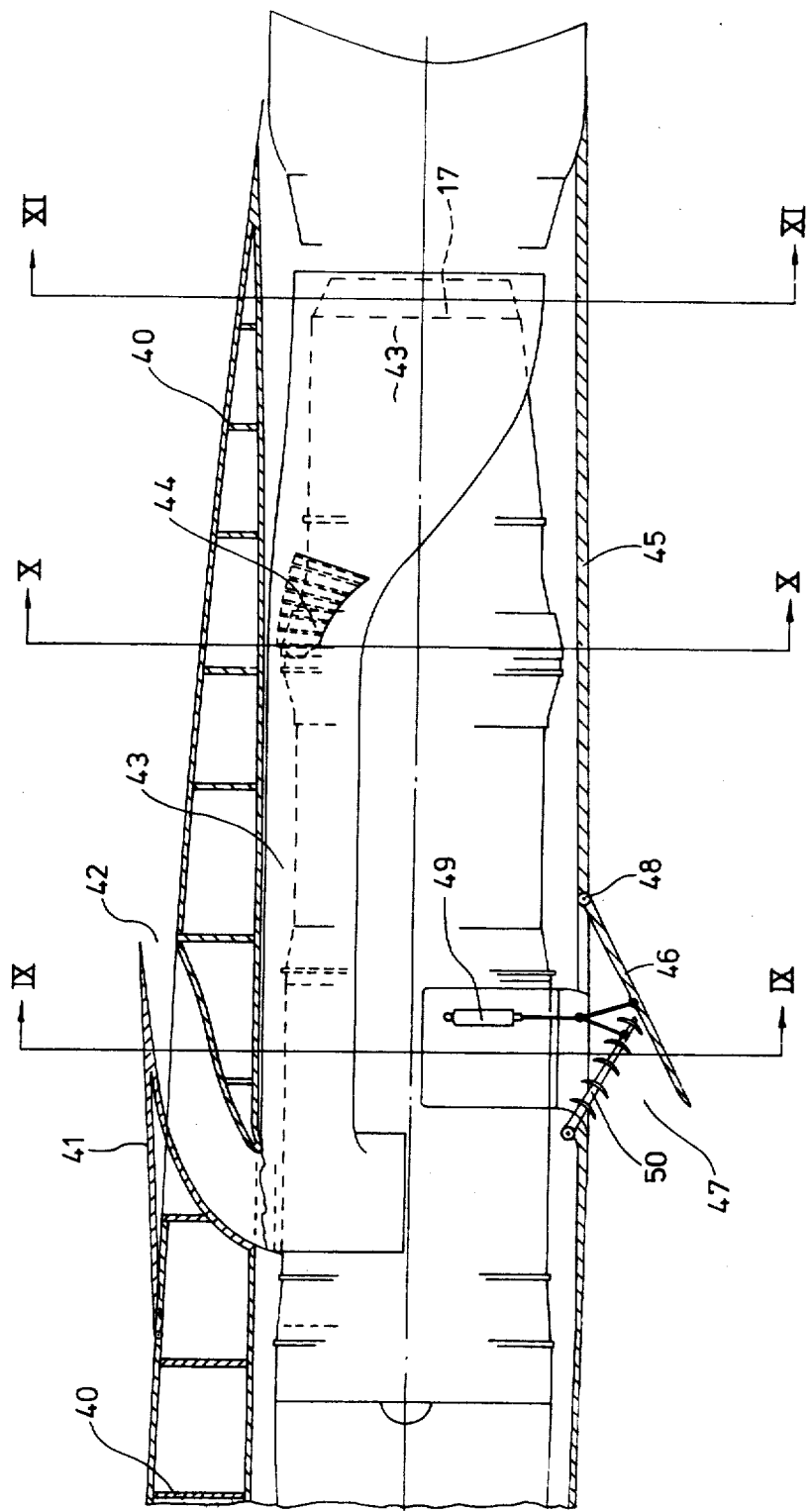
FIGS. 7 to 15 show a second embodiment.
Figure 8:
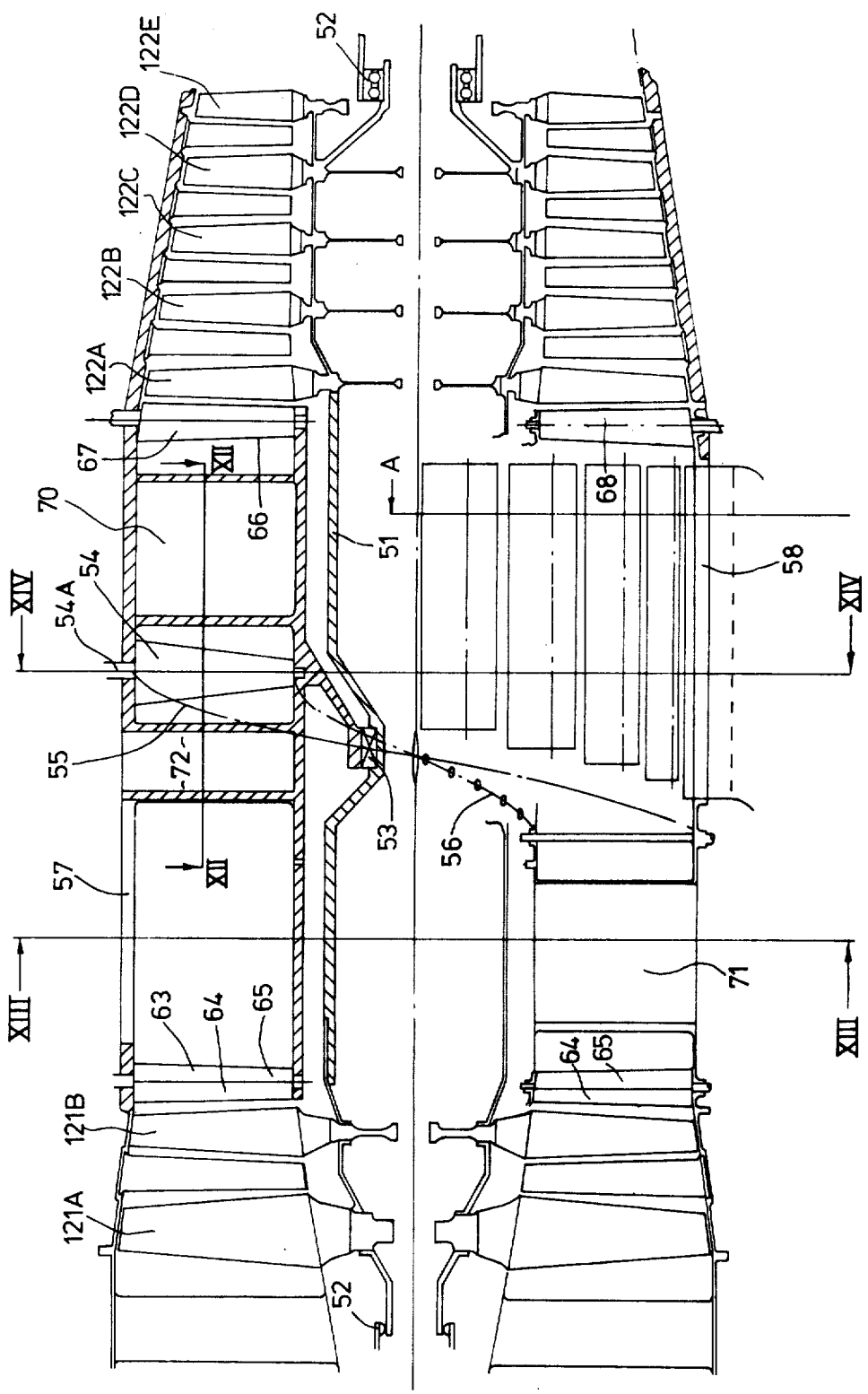
Figure 12:
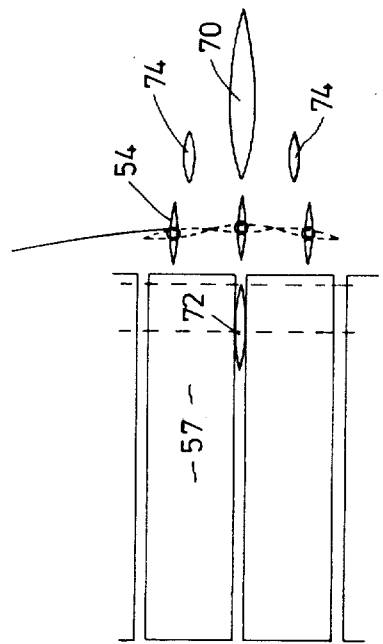
Figure 11:
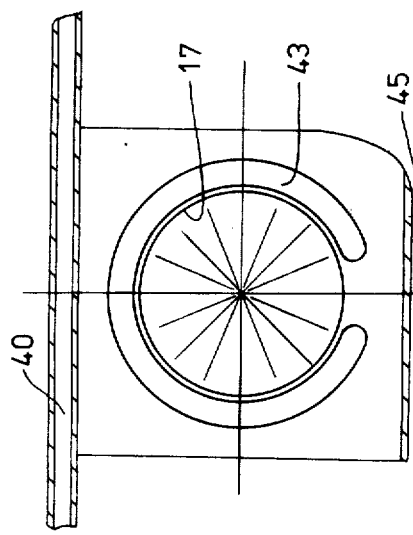
Figure 9:
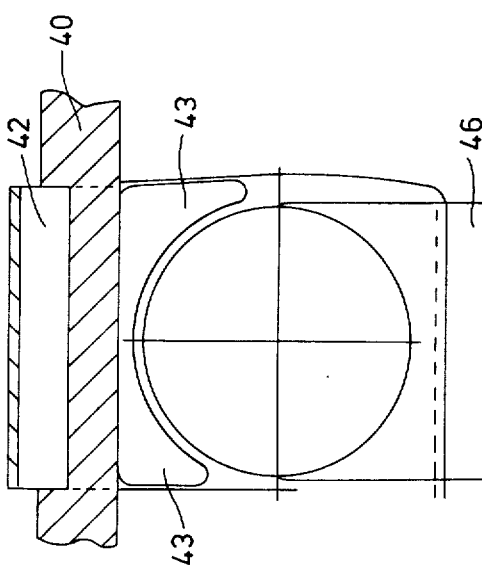
Figure 10:
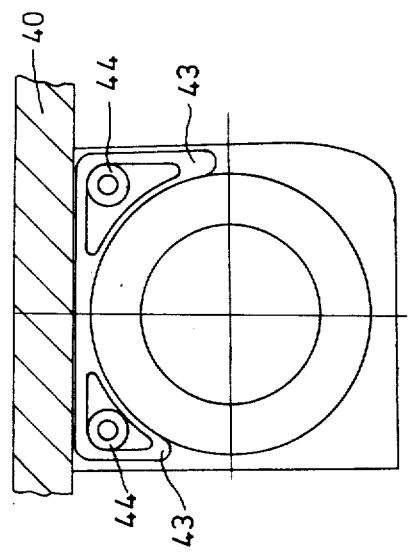
Figure 13:
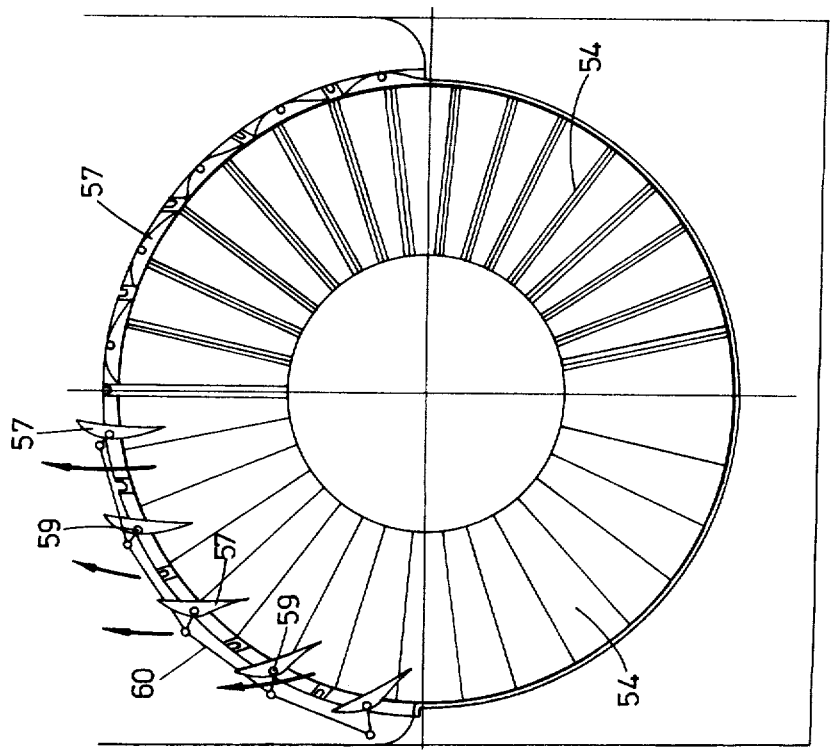
Figure 14:
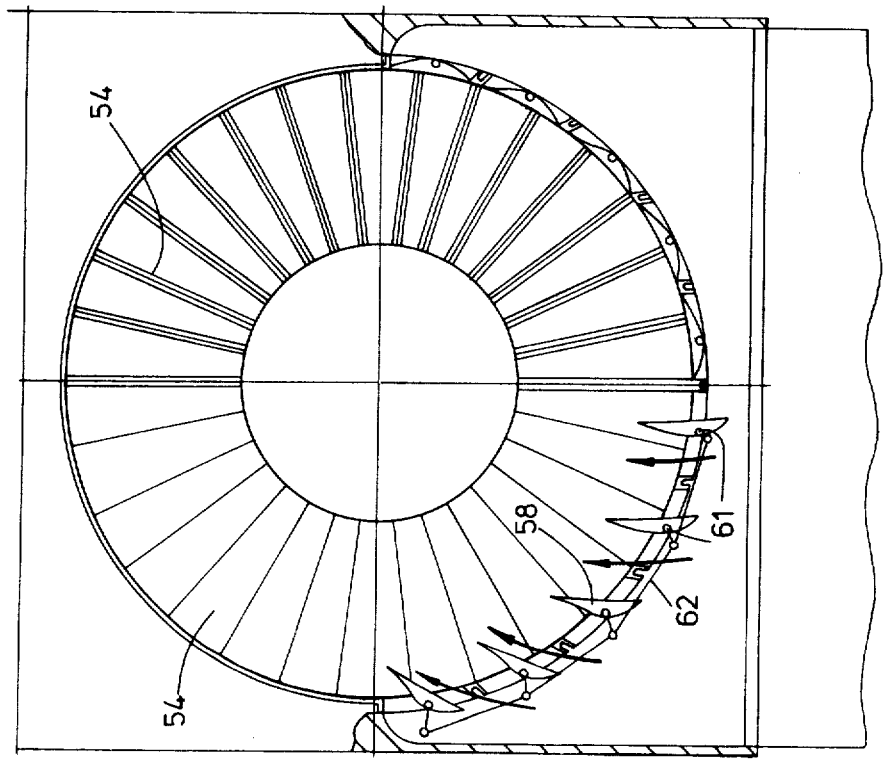
Figure 15:
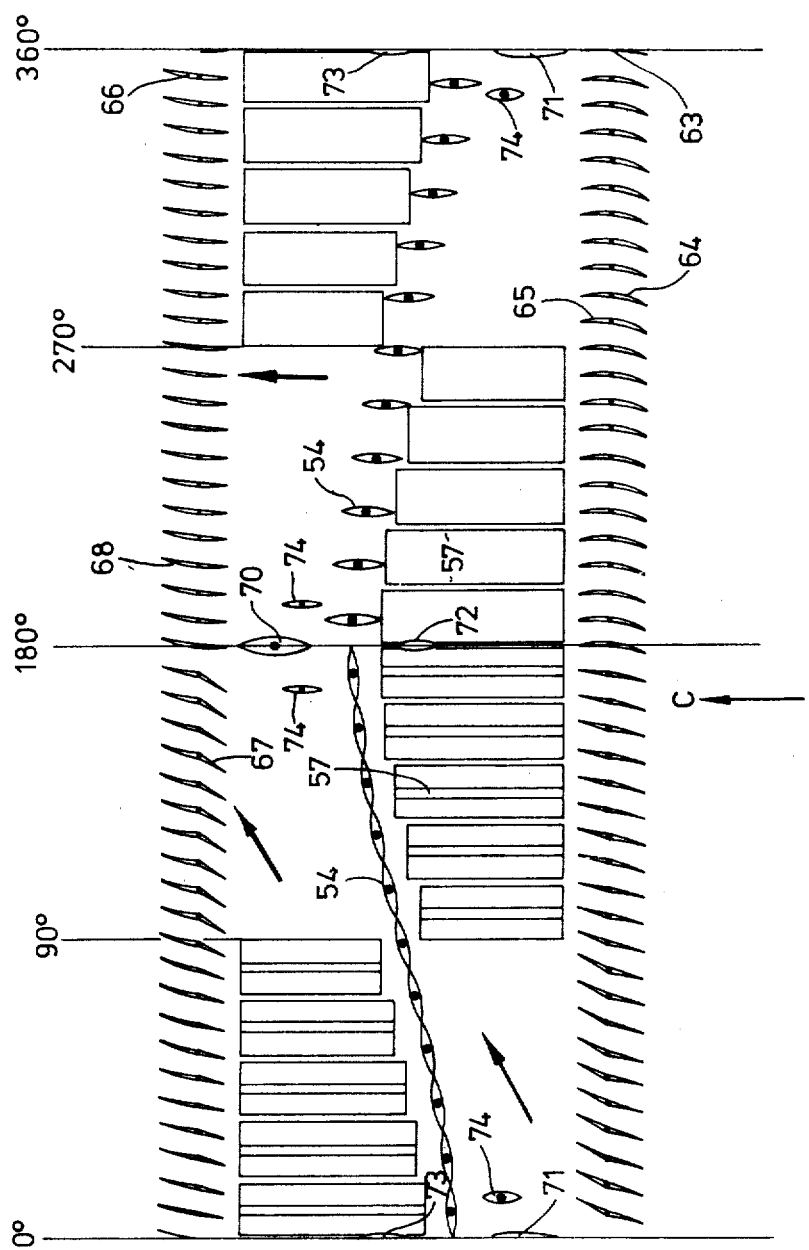

FIG. 7 is a side view, partly in section, showing the powerplant installation under an aircraft wing, FIG. 8 is a vertical section through a part of the engine of the powerplant of FIG. 7, FIG. 9 is a section on line IX—IX of FIG. 7, FIG. 10 is a section on line X—X of FIG. 7, FIG. 11 is a section taken on the line XI—XI of FIG. 7, FIG. 12 is a sectional plan taken on the line XII—XII of FIG. 8, FIG. 13 is a section on line XIII—XIII of FIG. 8, FIG. 14 is a section on line XIV—XIV of FIG. 8, and FIG. 15 is a developed diagram showing the valve and flap arrangements in the portion of the engine illustrated in FIG. 8.

Figure 1:
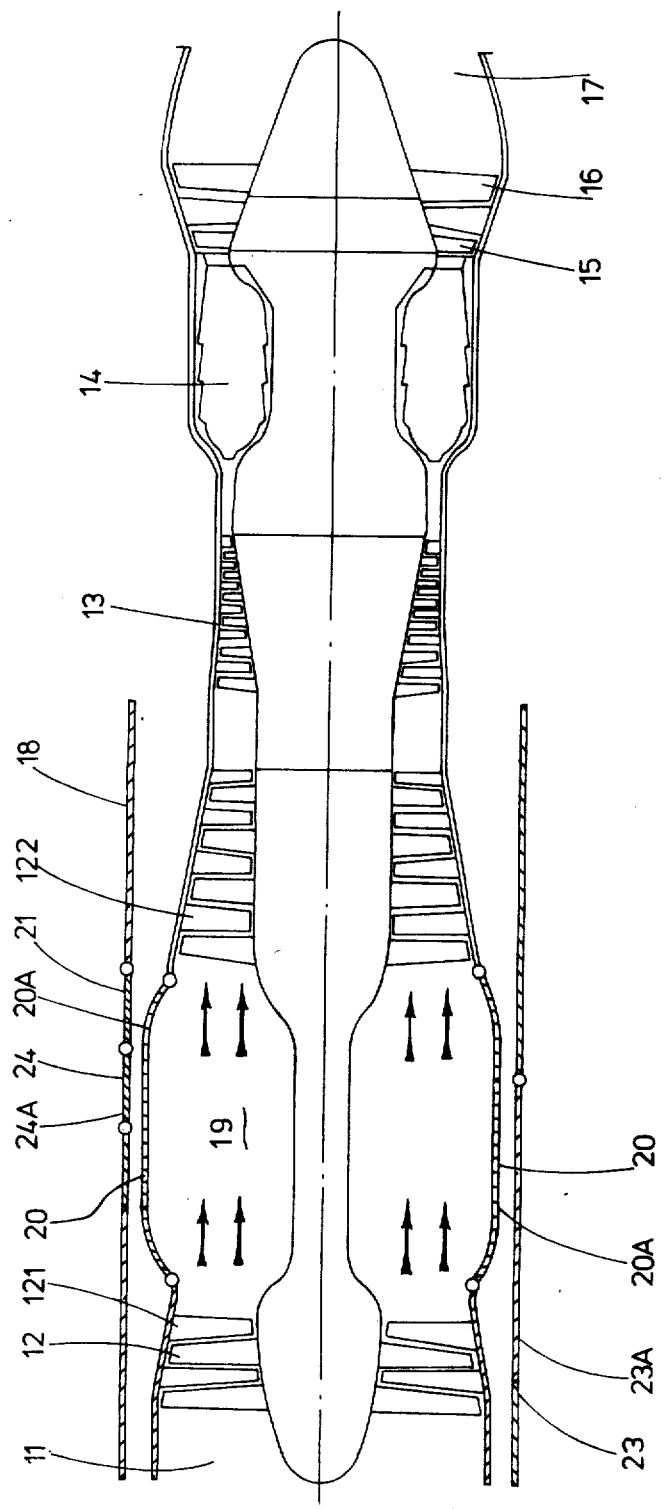
Figure 2:
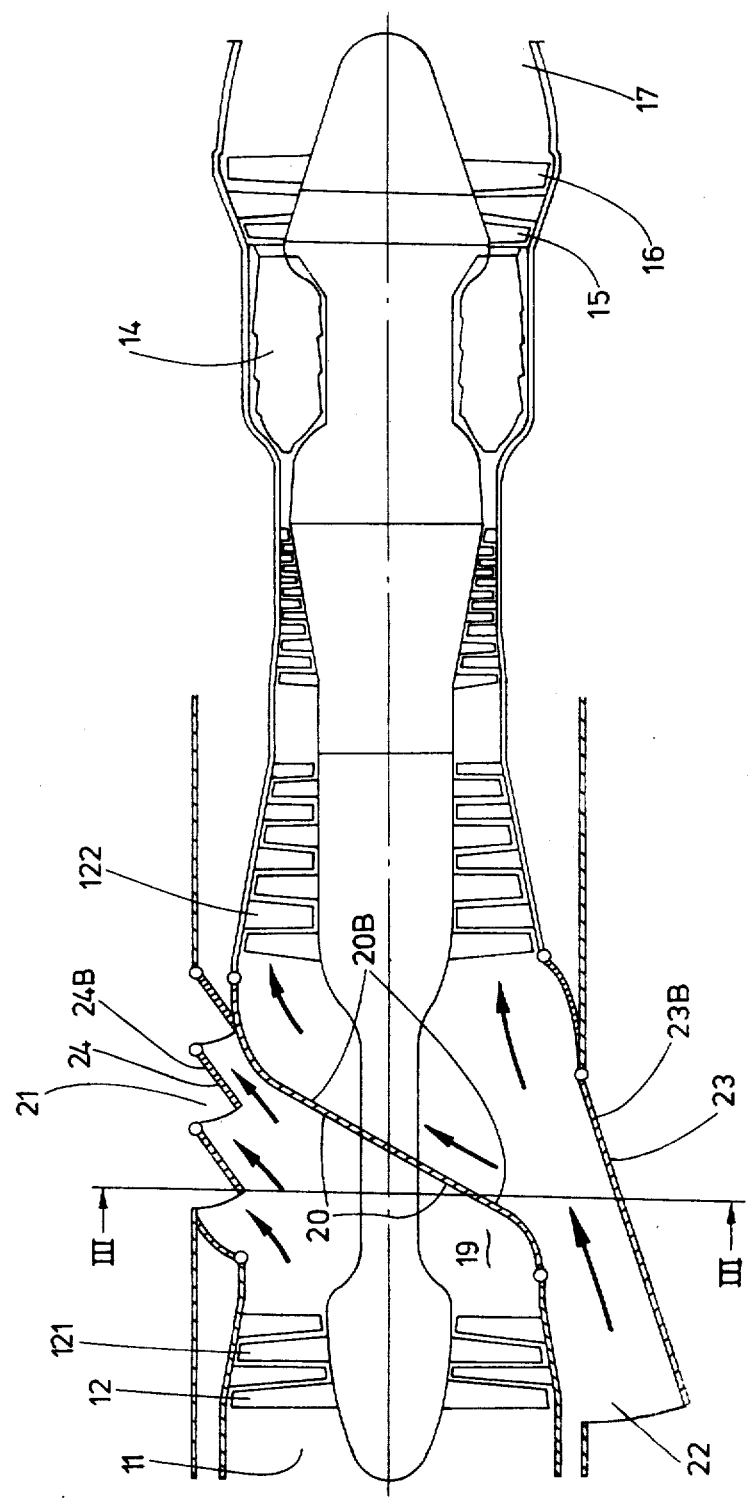
Figure 3:
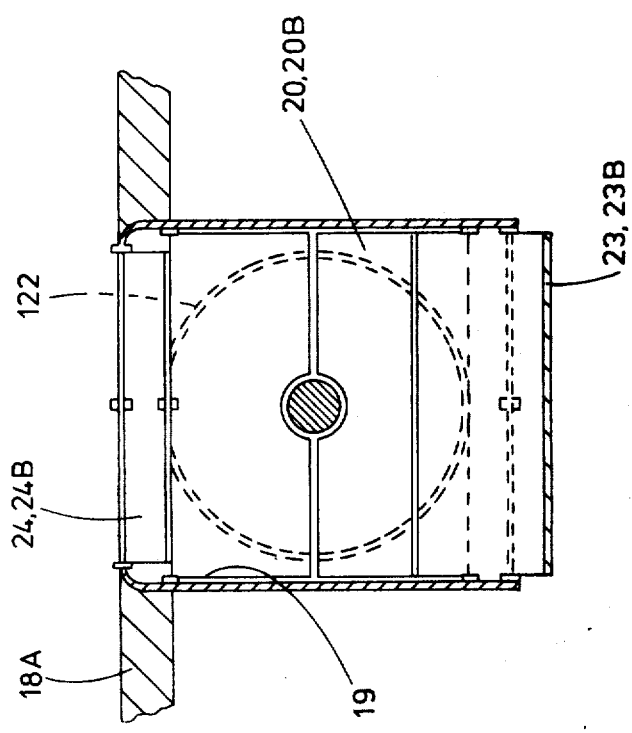

Referring to the drawings, the plant shown in FIGS. 1 to 3 comprises, in flow series, a first air intake 11, a low pressure compressor 12, a high pressure compressor 13, a combustor 14, high and low pressure turbines 15, 16 drivingly connected to the respective compressors, and a first nozzle 17. The powerplant is embodied in a nacelle 18 connected to the underside of a wing 18A of an aircraft, a portion of which is illustrated in FIG. 3.

The low pressure compressor comprises two parts 121, 122 connected in spaced apart relationship by a duct 19 of substantially square cross-section. Two opposite walls of the duct are constituted by doors 20 movable between positions 20A (FIG. 1) parallel to the compressor axis and positions 20B (FIG. 2) in which the doors extend across the compressor axis and the whole of the output of the part 121 is caused to flow towards one side of the plant to emerge to atmosphere through a second nozzle 21 provided in the side of the nacelle and having the form of a cascade of vanes 24 as shown.

The nacelle 18 includes a second air intake 22 normally closed by a panel 23 when the latter is in a position 23A (FIG. 1). When the doors 20 are moved into the position 20B the panel 23 is opened into position 23B (FIG. 2) to enable air flow into the compressor part 122.

The vanes 24 are pivotable between positions 24A (FIG. 1) and 24B (FIG. 2) so that the nozzle 21 can be closed.

It will be seen that the duct 19 and doors 20 define respectively a valve housing and a valve member means and that the doors 20, when in position 20A establish a first flow path between the parts 121 and 122. This condition will hereinafter be referred to as the "series condition" and means that the whole delivery of air from compressor part 121 is received by compressor part 122 and that these two compressor parts are in flow series. When in position 20B, the doors 20 constitute a partition extending obliquely across the first flow path and establishing two second flow paths respectively from the part 121 to the nozzle 21 and from the intake 22 to the part 122. This condition will hereinafter be referred to as the "parallel condition" and means that the whole delivery of air from compressor part 121 bypasses compressor part 122 and is used as bypass air. Also ambient air is taken directly into compressor part 122. The two compressor parts are then in parallel flow.

The doors 20 together with panel 23 and vanes 24, also form a means for generally closing the flow path through the plant to reduce turning of the compressor turbine assembly by the flight wind when the plant is for any reason shut down in the air. The general flow path can be closed by bringing the doors 20 into position 20B while closing the panel 23 into position 23A and the vanes 24 into position 24A.

Figure 6:
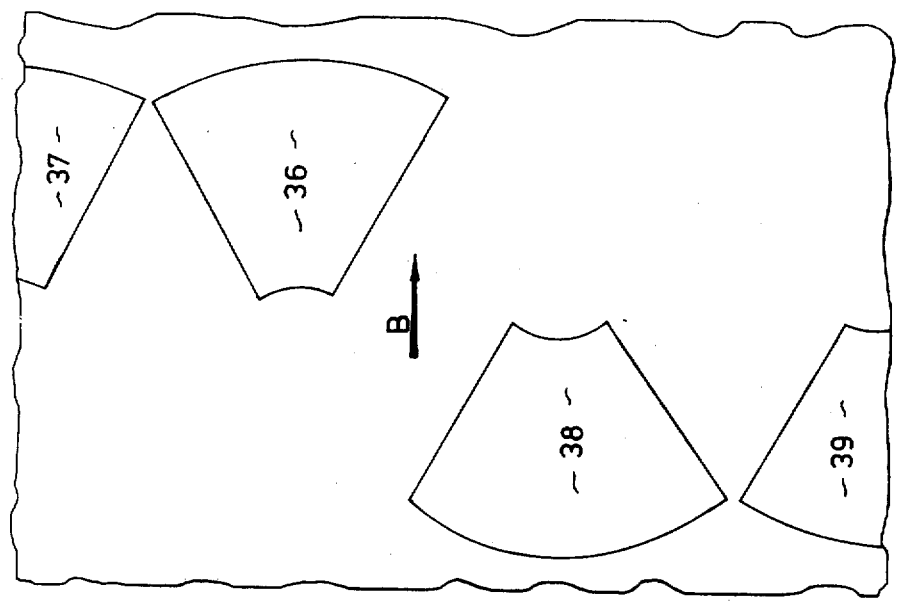
FIG. 6 is a developed view of the engine outer casing.
Figure 5:
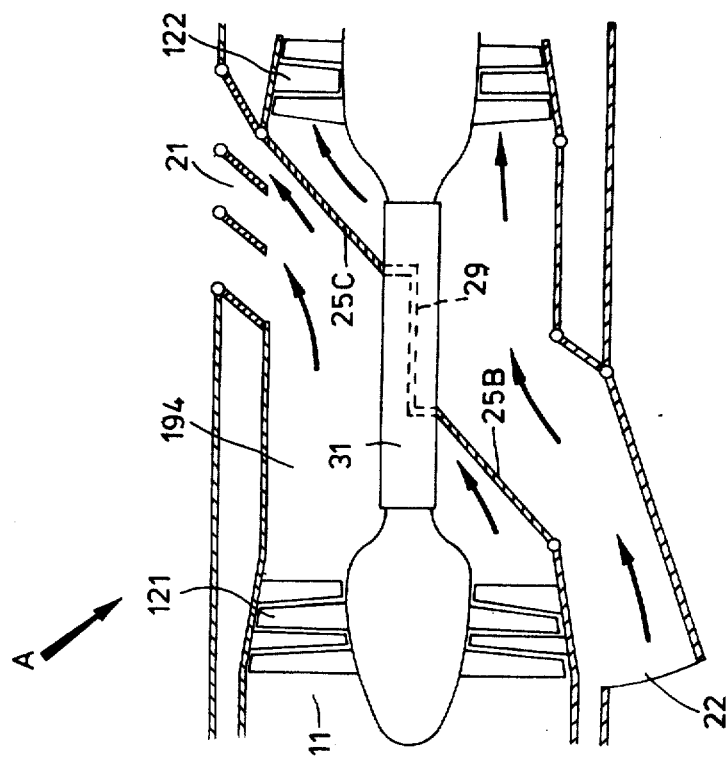

Referring now to FIGS. 4, 5 and 6, there is shown a different valve arrangement for effecting the same alternative series and parallel flow conditions as are shown in the arrangement of FIGS. 1 to 3. In this arrangement a circular duct 194 extends between compressor parts 121 and 122. In the series condition the delivery of part 121 flows into part 122. In the parallel condition, which is illustrated in FIGS. 4 and 5, four panels 25A, 25B, 25C and 25D constitute a partition which deflects the delivery of compressor part 121 towards nozzle 21 whilst allowing ambient air entering intake 22 to pass to compressor part 122. FIG. 4 is a broken-away view taken in the direction of arrow A of FIG. 5.

The panels 25 lie flush with the wall of the duct 194 in the series condition. In the parallel condition illustrated two right hand panels 25A, 25B (on the right as seen in the direction of air entering compressor part 121) are moved inwards to deflect to the left the air delivered on the right hand side from compressor part 121. Panels 25A, 25B seal one with the other along a horizontal edge 26. Panel 25A seals with a radial, longitudinal divider 27 along edge 28; panel 25B seals with a further radial, longitudinal divider 29 along edge 30. The two radial dividers 27, 29 provide mounting support for a tubular member 31 and panels 25A, 25B also seal with member 31 at their smaller, inner ends. Thus panels 25A, 25B and dividers 27, 29 together with tubular member 31, form a partition to seal the right hand side delivery of compressor part 121 from part 122 and to deflect it to the left.

Panels 25C, 25D similarly seal with dividers 27, 29 at edges 32, 33 and one with the other at edge 34 and thus deflect the whole of compressor part 121 delivery further to the left and out of nozzle 21. FIG. 4 illustrates two of the apertures which are opened in the wall of duct 194 when the panels 25 are moved inwards for the parallel condition. This Figure shows aperture 35 for panel 25C and aperture 36 for panel 25D. Apertures 35, 36 communicate with nozzle 21.

Tubular member 31 comprises a short stationary cylinder supported from dividers 27, 29 and surrounding the rotatable shaft which joins compressor parts 121 and 122.

FIG. 4 does not illustrate the air flowing into intake 22 but it will be understood that panels 25, dividers 27, 29 and member 31 together constitute a valve means and a partition to divide the two flows in the parallel condition.

FIG. 6 shows a developed view of the apertures in the wall of duct 194 formed to receive panels 25: arrow B shows the direction of air flowing through the engine. Apertures 36, 37 are the two shown in FIG. 4 by which air passes out to nozzle 21: apertures 38, 39 are the two by which air from intake 22 enters compressor part 122.

FIG. 7 to 14 show an installation in which the air delivered by the front compressor part 121 passes out over the top of the engine, whilst the air for delivery to the rear compressor part 122 enters from underneath the engine, the powerplant being installed beneath a wing of an aircraft. In this case the gas turbine engine comprises the parts illustrated in relation to the earlier Figures, namely, a front compressor part 121 and a rear compressor part 122, high pressure compressor 13, combustor 14, and high and low pressure turbines 15, 16 respectively. The exhaust from the low pressure turbine is delivered to the nozzle 17.

Referring now to FIG. 7, which shows the powerplant with the gas turbine engine operating in the parallel condition, a wing structure 40 has a panel 41 in its upper surface which is in the open position to define a nozzle 42 for a part of the efflux of front compressor part 121 to be delivered to atmosphere. The remainder of the efflux from compressor part 121 is delivered into a bypass duct 43 which lies around the top of the outside periphery of the gas turbine engine and which exhausts separately to atmosphere around nozzle 17. FIG. 9 shows the section of this duct at a portion just downstream from the connection of the duct to the delivery of compressor part 121 and FIG. 10 shows a section further downstream of the duct in which position there is provided combustion equipment 44 to enable fuel to be burnt in the bypass air for re-heat. Downstream of the re-heat combustor 44 the duct 43 opens out and almost completely surrounds the nozzle 17 so as to discharge annularly around it as shown in FIG. 11. In the parallel condition when the aircraft is taking off, the combustor 44 is out of use and the bypass air from duct 43 provides an enclosing layer of cold, relatively slow moving air around the hot jet efflux from nozzle 17, which is of considerable benefit in reducing the noise emanating from the aircraft.

The gas turbine engine is housed in a nacelle 45 and there is a panel 46 in the bottom of this nacelle which is lowered, in the parallel condition, to provide an intake 47 for air to be delivered to the rear compressor part 122. This panel 46 is pivoted at its downstream end at 48 to the nacelle and is operated by a jack 49 which also operates a cascade 50 of vanes and positions them to assit the entry and deflection of air through intake 47 in the parallel condition. In the series condition the vanes are stowed and are inoperative when panel 46 is shut.

Referring now to FIG. 8, the gas turbine engine is shown in the series condition in which the compressor part 122 receives the full delivery of the part 121. The two compressor parts of the low pressure compressor are shown in this drawing in some detail. They are connected together on a hollow shaft 51 which is supported at its front and rear ends on bearings 52 and between these two bearings is a further steady bearing 53. The compressor part 121 has two rows of rotatable blades 121A, 121B and the part 122 has five rows of rotatable blades 122A to E. Between the two compressor parts 121 and 122 is a valve comprising an annular array of vanes 54 each of which is arranged for pivotal movement about a respective axis 54A which lies radially of the engine axis of rotation. The array is staggered so as to lie obliquely to the axis of rotation of shaft 51 and lines 55 and 56 are the loci of all the axes 54A around the casing of the engine respectively at the outer and inner ends of the vanes 54. Mechanism is provided for rotating the vanes 54 but this is not shown. In the series condition the vanes lie in the fore and aft direction allowing communication between compressor parts 121 and 122. When rotated substantially through 90° from this position they form a complete barrier to the flow of air from part 121 to part 122 and consitute a partition between the two flows of air. This change is co-ordinated with the opening of panels 41 and 46 and with the opening of a series of flaps in two portions of the casing periphery of the engine. These flaps comprise a first series shown at 57 around the top half of the engine which open to allow the delivery of compressor part 121 to enter the nozzle 42 and bypass duct 43, and a further series 58 around the bottom half of the engine which open to communicate inlet 47 with compressor part 122.

The flaps 57 are shown in FIG. 13 and vanes 54 are also included in this section. In this Figure the left hand side shows the flaps 57 in the open position and the vanes 54 shut, for the parallel condition of the engine, whilst the right hand side shows flaps 57 closed and the vanes 54 open, for the series condition of the engine. There are five flaps on each side of the centre line and these are each pivoted at 59 and have a connecting linkage 60 operated by a jack (not shown) which opens and closes all the flaps together. With the vanes 54 shut and all the flaps 57 open, the whole delivery of the compressor section 121 is directed by the closed vanes upwards as seen from the approaching direction of flow and passes out between the flaps 57.

FIG. 14 shows the flaps 58 and these are each pivoted at 61 and connected through a linkage 62 similar to that for flaps 57. Also in FIG. 14 the left hand five flaps 58 are shown open with vanes 54 shut and the right hand flaps 58 are shown closed with flaps 54 on this side shut. In the open condition of flaps 58, which is the parallel condition of the engine, the air entering inlet 37 passes between the flaps 58 and is directed over the whole inlet face of compressor part 122. FIGS. 13 and 14 include vanes 54 although these would not be seen as drawn in the sections taken.

The compressor part 121 has a ring of stator vanes 63 at its downstream end each of which comprises a stationary upstream section 64 and a pivotable downstream section 65. Similarly the compressor part 122 has a ring of stator vanes 66 which comprise a pivotable upstream section 67 and a fixed downstream section 68. The pivotable sections 65, 67 of these two rings of stator vanes provide additional variable guidance to the air passing through the engine. In the series condition the vanes direct the air substantially parallel with the axis for rotation, whilst in the parallel condition the inclination of these vanes is varied so that the air is directed upwards after leaving compressor part 121 so that it passes out of nozzle 42 and into by-pass duct 43, whilst the air entering inlet 47 is directed upwards and correctly distributed to the first row of rotating blades of compressor part 122.

FIG. 15 is a developed view of the rings of stator vanes 63, 66. This Figure also shows the flaps 57, 58 and the vanes 54. In the left hand portion of the Figure all these parts are shown in the parallel condition of the engine, whilst in the right hand portion of this engine the series condition is shown. FIG. 15 is developed such that its centre, at line 180°, corresponds with the top of the engine i.e. the top of FIG. 8. The line 270° is the right side of the engine and line 90° is the left, whilst 0° and 360° are the bottom. Arrow C shows the direction of engine air flow.

The structure which supports the vanes 54 and the steady bearing 53 is additionally strengthened by a series of fixed steady vanes; these comprise two large vanes, 70, 71 and two further smaller stationary vanes 72, 73. These vanes are respectively disposed between the openings provided by flaps 56, 57 and do not perform any flow directing function. In addition each vane 70, 71 has two smaller vanes 74. The disposition of all these vanes is best seen in FIG. 12.

We claim:

1. A gas turbine powerplant comprisihng a gas turbine engine having a casing; a compressor located within said casing, said compressor having an upstream part and a downstream part, valve means disposed between said upstream and downstream compressor parts; a combustor located downstream of and in flow series with the downstream part of said compressor; turbine means in flow series with said combustor and arranged to drive said compressor; an exhaust nozzle arranged to receive the turbine exhaust and a bypass duct arranged for discharge to atmosphere, wherein said valve means has two alternative positions and further wherein the valve means comprises a first flap means hinged at its upstream end and arranged to form part of the casing in said first position and to pivot inwardly to said second position, and a second flap means hinged at its downstream end and arranged to form part of the casing in said first position and to pivot inwardly to the second position, and wherein in the first position the flap means are disposed for directing the delivery of the upstream part of the compressor into the downstream part of the compressor, and, in the second position the flap means are disposed for directing the delivery of the upstream part of the compressor into the bypass duct while simultaneously directing ambient air into the downstream part of the compressor.

2. A gas turbine powerplant according to claim 1, in which the first and second flap means comprises first and second panels which form part of the wall of a casing of the gas turbine engine in the first position of the valve means and which pivot to form together an oblique partition between the two parts of the compressor in said second position of the valve means.

* * * * *